(12) United States Patent
Tange et al.

(10) Patent No.: US 6,605,925 B2
(45) Date of Patent: Aug. 12, 2003

(54) POWER SOURCE CIRCUIT

(75) Inventors: Yoshihisa Tange, Chiba (JP); Tsutomu Ando, Chiba (JP)

(73) Assignee: Seiko Instruments Inc. (JP)

(*) Notice: Subject to any disclaimer, the term of this patent is extended or adjusted under 35 U.S.C. 154(b) by 0 days.

(21) Appl. No.: 10/076,743

(22) Filed: Feb. 14, 2002

(65) Prior Publication Data

US 2002/0109486 A1 Aug. 15, 2002

(30) Foreign Application Priority Data

Feb. 15, 2001 (JP) .................................... 2001-039084
Jan. 25, 2002 (JP) .................................... 2002-016673

(51) Int. Cl.$^7$ ................................................ H02J 7/00
(52) U.S. Cl. ................................................... 320/134
(58) Field of Search .............................. 320/132, 134

(56) References Cited

U.S. PATENT DOCUMENTS 5,963,019 A * 10/1999 Cheon ......................... 320/134
6,252,379 B1 * 6/2001 Fischl et al. ................ 320/134

FOREIGN PATENT DOCUMENTS

JP          11008939    * 1/1999
JP          411232914   * 8/1999

* cited by examiner

Primary Examiner—Edward H. Tso
Assistant Examiner—Pia Tibbits
(74) Attorney, Agent, or Firm—Adams & Wilks

(57) ABSTRACT

The invention provides a power source circuit which is capable of preventing a current from being caused to flow from a battery charger to a secondary battery in the overcharge detection state. In order to cut off a current from a parasitic diode of a transistor having a gate electrode to which a signal to release the over-current state is inputted from a switching-device-controlling logic circuit, a charge and discharge controlling circuit includes a diode connected between the transistor and a current detecting circuit, thereby preventing a current from being caused to flow from the battery charger to the secondary battery.

5 Claims, 3 Drawing Sheets

POWER SOURCE CIRCUIT

BACKGROUND OF THE INVENTION

1. Field of the Invention

The present invention relates to a power source circuit which is capable of monitoring a voltage of a secondary battery to control charge and discharge.

2. Description of the Related Art

FIG. 3 is a block diagram, partly in circuit diagram, showing schematically a configuration of a conventional power source circuit.

A negative external terminal 313 to which either a battery charger 310 or a load 311 is to be connected, is connected to a negative electrode of a secondary battery 301. A positive external terminal 312 to which the battery charger 310 or the load 311 is to be connected, is connected to a positive electrode of the secondary battery 301 through a switching device (P-channel MOS FET) 302 and a switching device (P-channel MOS FET) 303 connected in series. In addition, a charge and discharge controlling circuit 316 is connected in parallel with the secondary battery 301. The charge and discharge controlling circuit 316 has the function of detecting a voltage of the second battery 301 and a voltage developed across the switching devices 302 and 303.

That is, the charge and discharge controlling circuit 316 has the function of detecting the state in which the battery voltage of the secondary battery 301 is lower than a predetermined voltage value to turn OFF the switching device 302. Then, this state is referred to as "the over-discharge detection state" when applicable. In addition, the circuit 316 has the function of detecting the state in which the voltage developed across a VDD terminal 314 and a terminal 309 for detecting the battery charger connection and the over-current, is larger than a predetermined voltage value to turn OFF the switching device 302. Then, this state is referred to as "the over-current detection state" when applicable. Also, the circuit 316 has the function of detecting the state in which the battery voltage of the secondary battery 301 is higher than a predetermined voltage value to turn OFF the switching device 303. Then, this state is referred to as "the over-charge detection state" when applicable.

Now, the description will hereinbelow be given with respect to the operation in the case of the over-charge state. The battery charger 310 is connected between the positive external terminal 312 and the negative external terminal 313 to charge the secondary battery 301 with the electric charges, thereby providing the state in which the voltage developed across the VDD terminal 314 and a VSS terminal 315 is higher than a predetermined voltage value. At the time when this state has been provided, an over-charge and over-discharge detecting circuit 317 sends an over-charge detection signal to a logic circuit 318 for controlling switching devices. In response to the over-charge detection signal, the logic circuit 318 for controlling switching devices sends a signal to turn OFF the switching device 302 through a charge control terminal 304.

Next, the description will hereinbelow be given with respect to the operation in the case of the over-discharge state. The load 311 is connected between the positive external terminal 312 and the negative external terminal 313 to discharge the secondary battery 301, thereby providing the state in which the voltage developed across the VDD terminal 314 and the VSS terminal 315 is lower than the predetermined voltage value. At the time when this state has been provided, the over-charge and over-discharge detecting circuit 317 sends an over-discharge detection signal to the logic circuit 318 for controlling switching devices. In response to the over-discharge detection signal, the logic circuit 318 for controlling switching devices sends a signal to turn OFF the switching device 303 through a discharge control terminal 305.

Finally, the description will hereinbelow be given with respect to the operation in the case of the over-current state. At the time when the terminal voltage developed across the VDD terminal 314 and the terminal 309 for detecting the battery charger connection and the over-current, has become larger than a predetermined voltage value, a circuit 319 for detecting the battery charger connection and the over-current sends an over-current detection signal to the logic circuit 318 for controlling switching devices. In response to the over-current detection signal, the logic circuit 318 for controlling switching devices sends a signal to turn OFF the switching device 303 through the discharge control terminal 305. In addition, when the load 311 is connected to provide the over-current state, the terminal 309 for detecting the battery charger connection and the over-current is pulled down. However, at the time when the load 311 between the positive external terminal 312 and the negative external terminal 313 is released, a signal to turn ON the P-channel MOS FET 306 is sent from the logic circuit 318 for controlling switching devices to pull up the terminal 309 for detecting the battery charger connection and the over-current to VDD, thereby carrying out the release of the over-current state.

Here, when the battery charger 310 is connected in the over-charge detection state, even if the switching device 303 is turned OFF, the current is caused to flow from the battery charger 310 to the secondary battery 301 through a current path 320 passing through the positive external terminal 312, the terminal 309 for detecting the battery charger connection and the over-current, and a parasitic diode 308 of the P-channel MOS FET 306 so that the battery 301 is charged with the electric charges. For this reason, a resistor 307 is provided in order to limit an amount of current which is caused to flow from the battery charger 310 to the secondary battery 301.

As described above, in the conventional power source circuit, the resistor 307 is provided in order to limit an amount of current which is caused to flow from the battery charger 310 to the secondary battery 301. However, since the current is caused to flow through the resistor, it is impossible to cut off perfectly the current path.

SUMMARY OF THE INVENTION

In the light of the foregoing, the present invention has been made in order to solve the above-mentioned problems associated with the prior art, and it is therefore an object of the present invention to prevent a current from being caused to flow into a secondary battery by providing a diode instead of employing a resistor having a fixed magnitude of resistance.

Another object of the present invention is to provide a power source circuit having a current limit function of adjusting an amount of current of a secondary battery, the power source circuit comprising: a negative external terminal through which one of a battery charger and a load is connected to a negative electrode side of the secondary battery; a positive external terminal through which one of the battery charger and the load is connected to a positive electrode side of the secondary battery via a switching device connected in series with the positive electrode side of the secondary battery; and a charge and discharge controlling circuit connected in parallel with the secondary battery, wherein the charge and discharge controlling circuit includes: a voltage detecting circuit for detecting a voltage of the secondary battery to output a signal; a switching-device-controlling logic circuit for in response to the signal from the voltage detecting circuit, controlling the switching device; a current detecting circuit for outputting a signal to control the switching-device-controlling logic circuit on the basis of a value of the electric potential difference between a voltage of the positive electrode of the secondary battery and a voltage of the positive external terminal; a transistor having a gate electrode to which a signal having the information that exhibits the over-current state is inputted from the switching-device-controlling logic circuit; and a diode connected between the transistor and the current detecting circuit for cutting off a current from a parasitic diode of the transistor.

BRIEF DESCRIPTION OF THE DRAWINGS

The above and other objects and advantages of the present invention will become clear from the following description with reference to the accompanying drawings, wherein.

DETAILED DESCRIPTION OF THE PREFERRED EMBODIMENTS

The preferred embodiments of the present invention will hereinafter be described in detail with reference to the accompanying drawings.

Figure 1:
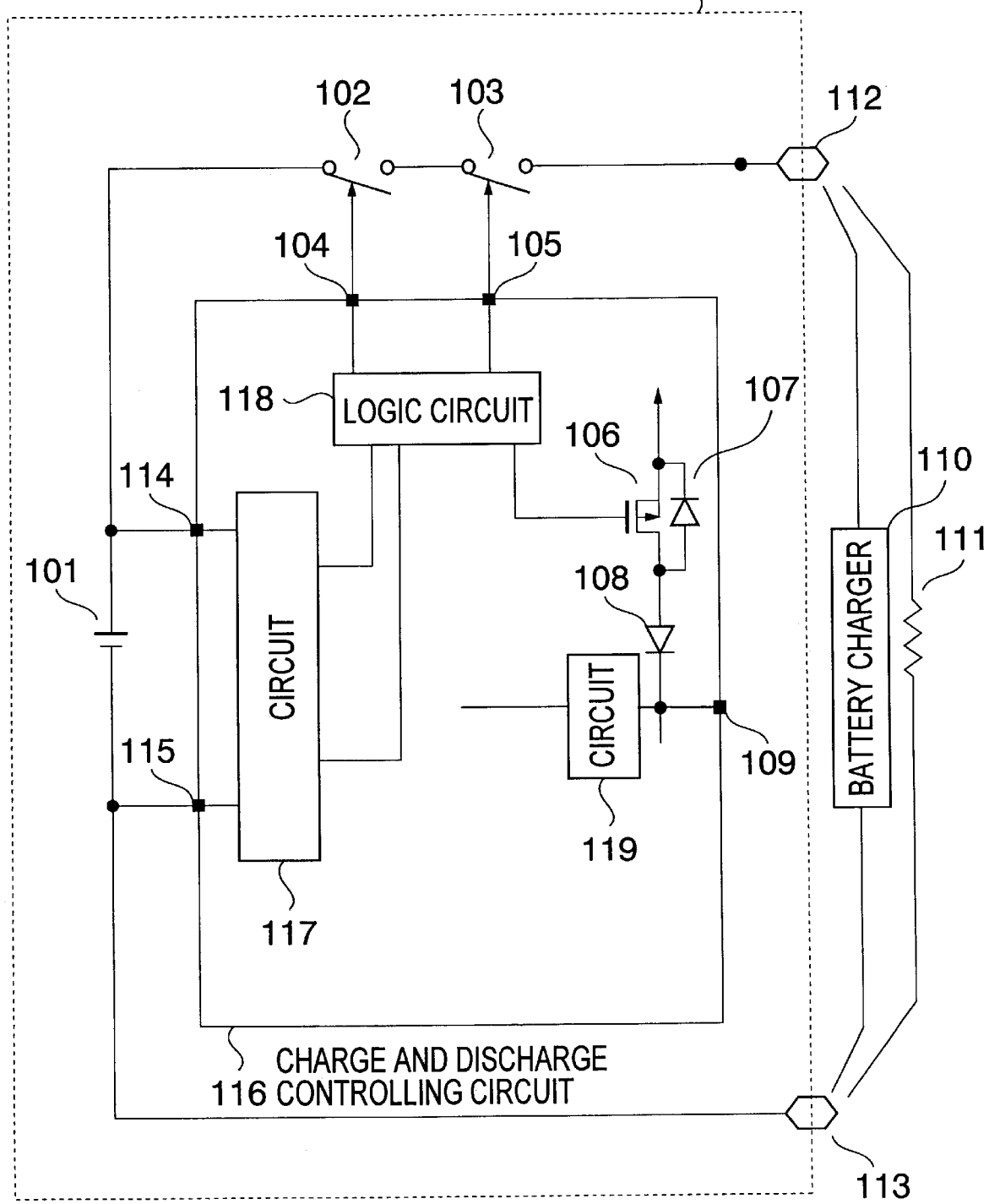
FIG. 1 is a block diagram, partly in circuit diagram, showing a configuration of a power source circuit according to an embodiment of the present invention.

FIG. 1 shows a power source circuit according to an embodiment of the present invention in which each of switching devices 102 and 103 for controlling charge and discharge is a P-channel MOS FET.

In a power source circuit 100, a positive external terminal 112 to which either a battery charger 110 or a load 111 is to be connected, is connected to a positive electrode of a secondary battery 101, and the battery charger 110 or the load 111 is connected to the positive electrode of the secondary battery 101 through the switching device 102 and the switching device 103 connected in series. In addition, a charge and discharge controlling circuit 116 is connected in parallel with the secondary battery 101. The charge and discharge controlling circuit 116 has the function of detecting a voltage of the secondary battery 101 and a voltage developed across the switching devices 102 and 103.

The operation of the power circuit of the embodiment is similar to that of the conventional power source circuit.

Next, the operation of the power source circuit of the embodiment will hereinbelow be described in detail.

First of all, the description will now be given with respect to the operation in the case of the over-charge state. The battery charger 110 is connected between the positive external terminal 112 and the negative external terminal 113 to charge the secondary battery 101 with the electric charges, thereby providing the state in which the voltage developed across a VDD terminal 114 and a VSS terminal 115 is higher than a predetermined voltage value. At the time when this state has been provided, a circuit 117 for detecting over-charge and over-discharge sends an over-charge detection signal to a logic circuit 118 for controlling switching devices. In response to the over-charge detection signal, the logic circuit 118 for controlling switching devices sends a signal to turn OFF the switching device 102 through a charge control terminal 104.

Next, the description will hereinbelow be given with respect to the operation in the case of the over-discharge state. The load 111 is connected between the positive external terminal 112 and the negative external terminal 113 to discharge the secondary battery 101, thereby providing the state in which the voltage developed across the VDD terminal 114 and the VSS terminal 115 is lower than the predetermined voltage value. At the time when this state has been provided, the circuit 117 for detecting over-charge and over-discharge sends an over-discharge detection signal to the logic circuit 118 for controlling switching devices. In response to the over-discharge detection signal, the logic circuit 118 for controlling switching devices sends a signal to turn OFF the switching device 103 through a discharge control terminal 105.

Finally, the description will hereinbelow be given with respect to the operation in the case of the over-current state. At the time when the terminal voltage developed across the VDD terminal 114 and the terminal 109 for detecting the battery charger connection and the over-current, has become larger than a predetermined voltage value, a circuit 119 for detecting the battery charger connection and the over-current sends an over-current detection signal to the logic circuit 118 for controlling switching devices. In response to the over-current detection signal, the logic circuit 118 for controlling switching devices sends a signal to turn OFF the switching device 103 through the discharge control terminal 105. In addition, when the load 111 is connected to provide the over-current state, the terminal 109 for detecting the battery charger connection and the over-current is pulled down. However, at the time when the load 111 between the positive external terminal 112 and the negative external terminal 113 is released, a signal to turn ON the P-channel MOS FET 106 is sent from the logic circuit 118 for controlling switching devices to pull up the terminal 109 for detecting the battery charger connection and the over-current to VDD to carry out the release of the over-current state.

Figure 3:
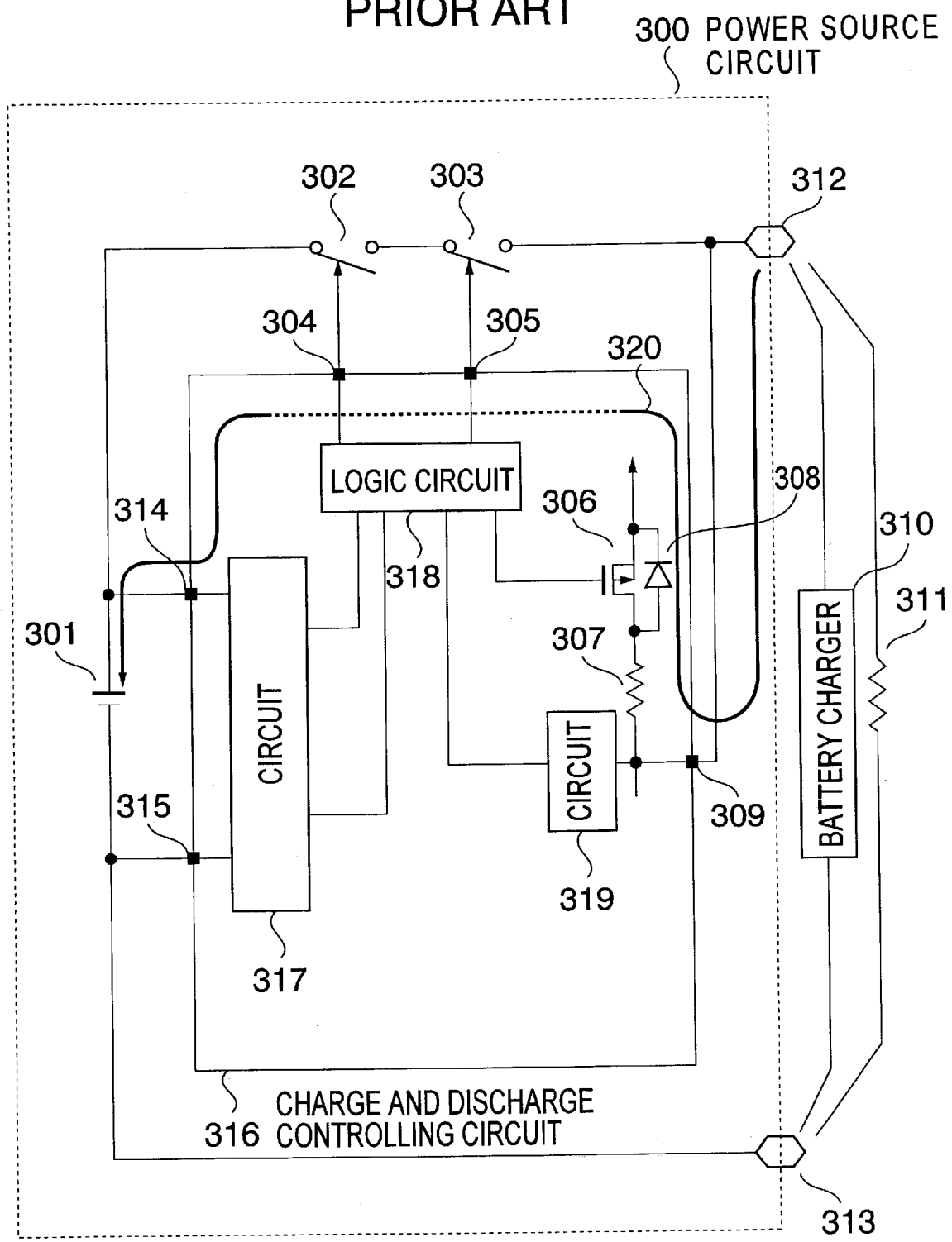
FIG. 3 is a block diagram, partly in circuit diagram, showing a configuration of a conventional power source circuit.

Here, a diode 108 is provided in the position of the resistor 307 shown in FIG. 3 instead thereof. As a result, it is possible to cut off perfectly the current path 320 shown in FIG. 3 through which the current is caused to flow from the positive external terminal 112 to the secondary battery 101 via the terminal 109 for detecting the battery charger connection and the over-current and the parasitic diode 107 of the P-channel MOS FET 106 even when the battery charge 110 is connected in the over-current detection state. As a result, the current is prevented from being caused to flow into the secondary battery 101 so that the secondary battery is prevented from being charged with the electric charges in the over-charge detection state.

Figure 2:
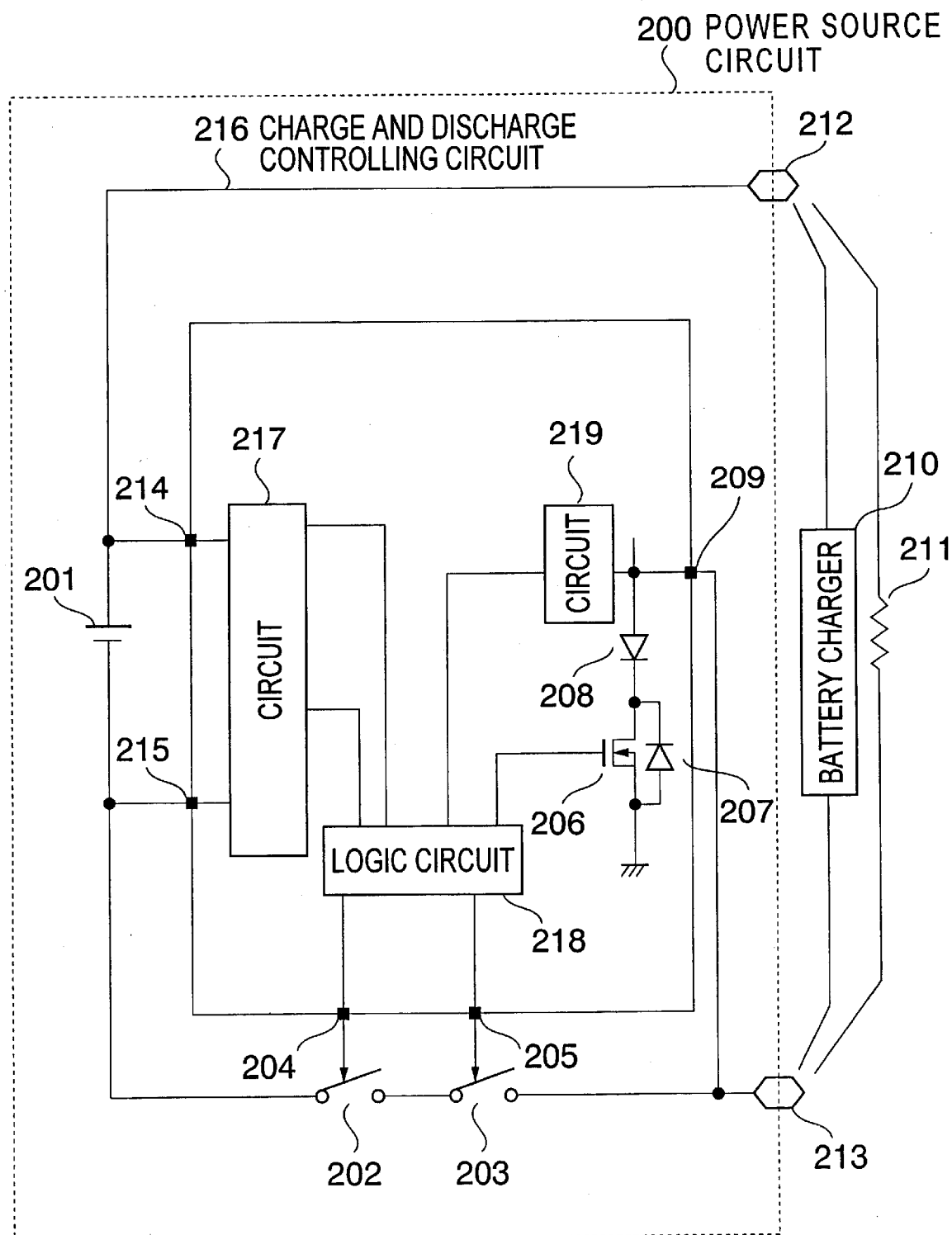
FIG. 2 is a block diagram, partly in circuit diagram, showing a configuration of a power source circuit according to another embodiment of the present invention.

FIG. 2 shows a power source circuit according to another embodiment of the present invention in which the switching device for controlling charge and discharge is an N-channel MOS FET. The case where the switching device for controlling charge and discharge is an N-channel MOS FET can also be described similarly to the case where the switching device for controlling charge and discharge is the P-channel MOS FET.

Since at the time when a battery charger 210 is connected between a positive external terminal 212 and a negative external terminal 213 in the over-charge detection state, a current is caused to flow from a VSS terminal 215 to a battery charger 210 via a parasitic diode 207, a diode 208 is disposed as shown in FIG. 2. As a result, it is possible to cut off a current path passing through a secondary battery 201 and the battery charger 210, and hence the secondary battery is prevented from being charged with the electric charges in the over-charge state.

As set forth hereinabove, according to the present invention, the diode is disposed in the position between the terminal for detecting the battery charger connection and the over-current and the P-channel MOS FET, i.e., in the position where the resistor 307 shown in FIG. 3 is disposed, whereby it is possible to prevent a current from being caused to flow from the battery charger to the secondary battery.

While the present invention has been particularly shown and described with reference to the preferred embodiments, it will be understood that the various changes and modifications will occur to those skilled in the art without departing from the scope and true spirit of the invention. The scope of the invention is therefore to be determined solely by the appended claims.

What is claimed is:

1. A rechargeable power source circuit comprising: a secondary battery; a switching circuit for controlling an amount of current flowing in the secondary battery; overcharge detecting means for detecting an overcharged state of the secondary battery and outputting a corresponding signal; overcurrent detecting means for detecting an overcurrent state of the secondary battery and outputting a corresponding signal; a logic circuit for receiving the output signals of the overcharge detecting means and the overcurrent detecting means and outputting signals for controlling the switching circuit; a battery charger detecting circuit for detecting when a battery charger is connected to charge the secondary battery; a transistor connected between a power source voltage and an overcurrent detecting terminal for allowing the overcurrent detecting terminal to return to a normal state from the overcurrent state when a load is disconnected from the secondary battery; and a diode connected in series with the transistor for preventing a current to flow from the battery charger to the secondary battery.

2. A power source circuit having a current limit function of adjusting an amount of current of a secondary battery, said power source circuit comprising:
   a negative external terminal through which one of a battery charger and a load is connected to a negative electrode side of the secondary battery;
   a positive external terminal through which one of the battery charger and the load is connected to a positive electrode side of the secondary battery via a switching device connected in series with the positive electrode side of the secondary battery; and
   a charge and discharge controlling circuit connected in parallel with the secondary battery,
   wherein the charge and discharge controlling circuit includes:
      a voltage detecting circuit for detecting a voltage of the secondary battery to output a signal;
      a switching-device-controlling logic circuit for in response to the signal from the voltage detecting circuit, controlling the switching device;
      a current detecting circuit for outputting a signal to control the switching-device-controlling logic circuit on the basis of a value of the electric potential difference between a voltage of the positive electrode of the secondary battery and a voltage of said positive external terminal;
      a transistor having a gate electrode to which a signal having the information that exhibits the over-current state is inputted from the switching-device-controlling logic circuit; and
      a diode connected between the transistor and the current detecting circuit for cutting off a current from a parasitic diode of the transistor.

3. A power source circuit having a switching device for limiting an amount of current of a secondary battery, the power source circuit comprising:
   a negative external terminal through which one of a battery charger and a load is connected to a negative electrode side of the secondary battery;
   a positive external terminal through which one of the battery charger and the load is connected to a positive electrode side of the secondary battery via the switching device connected in series with the positive electrode side of the secondary battery; and
   a charge and discharge controlling circuit connected in parallel with the secondary battery and comprising a voltage detecting circuit for detecting a voltage of the secondary battery and outputting a corresponding signal, a logic circuit for controlling the switching device in response to the signal from the voltage detecting circuit, a current detecting circuit for detecting an overcurrent state of the secondary battery by outputting a signal for controlling the logic circuit on the basis of a value of the potential difference between a voltage of the positive electrode of the secondary battery and a voltage of the positive external terminal, a transistor having a gate electrode connected to an output of the logic circuit indicating the overcurrent state of the secondary battery for returning an overcurrent detection terminal to a normal state from the overcurrent state when a load has been disconnected from the secondary battery, and a diode connected between the transistor and the current detecting circuit for preventing current from flowing through a parasitic diode of the transistor.

4. A power source circuit having a switching device for limiting an amount of current flowing in a secondary battery, the power source circuit comprising:
   a negative external connection terminal through which one of a battery charger and a load is connected to a negative electrode of the secondary battery;
   a positive external connection terminal through which one of the battery charger and the load is connected to a positive electrode of the secondary battery, the switching device being connected in series with one of the positive and negative electrode of the secondary battery;
   a logic circuit for controlling the switching device; and
   a charge and discharge controlling circuit connected in parallel with the secondary battery for controlling charging and discharging of the secondary battery and comprising a current detecting circuit for detecting an overcurrent state of the secondary battery by outputting a signal on the basis of a value of the potential difference between a voltage of the positive electrode of the secondary battery and a voltage of the positive external terminal, a transistor having a gate electrode connected to an output of the logic circuit indicating the overcurrent state of the secondary battery for returning an overcurrent detection terminal to a normal state from the overcurrent state when a load has been disconnected from the secondary battery, and a diode connected between the transistor and the current detecting circuit for preventing current from flowing through a parasitic diode of the transistor.

5. A power source circuit according to claim 4; further comprising a voltage detecting circuit for detecting a voltage of the secondary battery and outputting a corresponding signal; and wherein the logic circuit controls the switching device in response to the output signal of the voltage detecting circuit and the output signal of the current detecting circuit.

* * * * *